350-96.23 SR
XR 3,777,150

United Stat

Miller

[11] 3,777,150
[45] Dec. 4, 1973

[54] MODE DETECTION AND DELAY EQUALIZATION IN MULTIMODE OPTICAL FIBER TRANSMISSION SYSTEMS

[75] Inventor: Stewart Edward Miller, Locust, N.J.

[73] Assignee: Bell Telephone Laboratories, Incorporated, Murray Hill, N.J.

[22] Filed: July 17, 1972

[21] Appl. No.: 272,370

[52] U.S. Cl. .......... 250/209, 250/211 R, 250/211 J, 250/220 M, 250/227, 333/95 R, 350/96 WG
[51] Int. Cl. .......................... G02b 5/14, H01p 3/12
[58] Field of Search ............... 350/96 WG; 250/227, 250/211, 211 J, 220 M; 333/95

[56] References Cited

UNITED STATES PATENTS 3,584,230 6/1971 Tien ............................ 350/96 WG
3,689,772 9/1972 George ............................ 250/211 J

*Primary Examiner*—James W. Lawrence
*Assistant Examiner*—T. N. Grigsby
*Attorney*—W. L. Keefauver et al.

[57] ABSTRACT

This application describes a detector-equalizer circuit for equalizing the dispersion produced in a multimode optical fiber. The circuit comprises an array of photodetectors whose physical configurations conform to the radiation pattern at the end of the optical fiber. The photodetectors selectively respond to each of the modes or to groups of modes propagating along the fiber. The several output signals thus produced are delayed an appropriate amount relative to each other, and then combined in time coincidence in a common output circuit.

10 Claims, 4 Drawing Figures

3777150
OR IN 250/209

MODE DETECTION AND DELAY EQUALIZATION IN MULTIMODE OPTICAL FIBER TRANSMISSION SYSTEMS

The invention relates to mode detectors and detector-equalizer circuits for use with multimode optical fibers.

BACKGROUND OF THE INVENTION

Recent advances in the fabrication of ultratransparent materials have demonstrated that fibers are a promising transmission medium for optical communication systems. By using coherent sources and single mode fibers, such systems are theoretically capable of operating at pulse rates of the order of tens of gigahertz.

There are, however, many applications which are preferably optimized with respect to cost and simplicity, rather than speed. Systems of this latter kind would employ incoherent light sources and multimode fibers.

In the copending application by E. A. J. Marcatili, Ser. No. 247,448, filed Apr. 28, 1972, there is described an arrangement for coupling an incoherent signal source to a multimode fiber. As noted therein, one of the problems associated with such systems is the delay distortion resulting from the fact that the various modes propagate with different group velocities. While means are disclosed for minimizing this distortion, it cannot be totally eliminated.

It is, accordingly, a first object of the present invention to minimize the delay distortion produced in multimode optical fibers.

The various modes capable of propagating along a multimode optical fiber can also be used as the carriers in a spacially multiplexed communication system. In this latter case, means must be provided at the output end of the fiber for separating the various modes.

It is, therefore, a second object of the invention to separate the modes propagating along a multi-mode optical fiber.

SUMMARY OF THE INVENTION

In accordance with a first embodiment of the present invention, the different modes, or groups of modes at the output end of a multimode optical fiber are separately detected, and the resulting output signals combined in time coincidence in a common output load. As is known, the energy radiated from the end of a multimode optical fiber is concentrated along a plurality of cones, where each mode has a characteristic cone angle. Thus, each of the modes, or groups of modes, can be separately detected by means of photodetectors whose spacial distribution conforms to the modal radiation pattern. In the specific embodiment of the invention to be described in greater detail hereinbelow, a plurality of concentric circular photodetectors are located adjacent to the fiber end in a plane perpendicular to the fiber axis. Each photodetector is dimensioned to respond primarily to a different group of modes. The resulting output signals produced thereby are selectively delayed and combined, in time coincidence, in a common output circuit.

In a second embodiment of the present invention, the above-described array of photodetectors is used to detect and separate the various modes propagating along a multimode fiber. In this latter case, the outputs from the several detectors are coupled to different output circuits rather than to a common output circuit.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
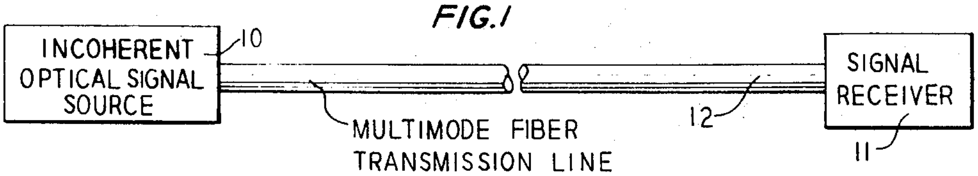
FIG. 1 shows, in block diagram, a multimode optical communication system.

Referring to the drawings, FIG. 1 shows, in block diagram, an optical communication system comprising an incoherent optical signal source 10, a signal receiver 11, and a multimode optical fiber transmission line 12 coupling the source to the receiver.

The present invention relates particularly to the output portion of the system and, specifically, to the signal detector in the receiver. In this regard, reference is now made to FIG. 2 which shows the output end of line 12, comprising a clad optical fiber, and the radiation pattern of the wave energy emitted by the fiber.

Figures 2, 4:
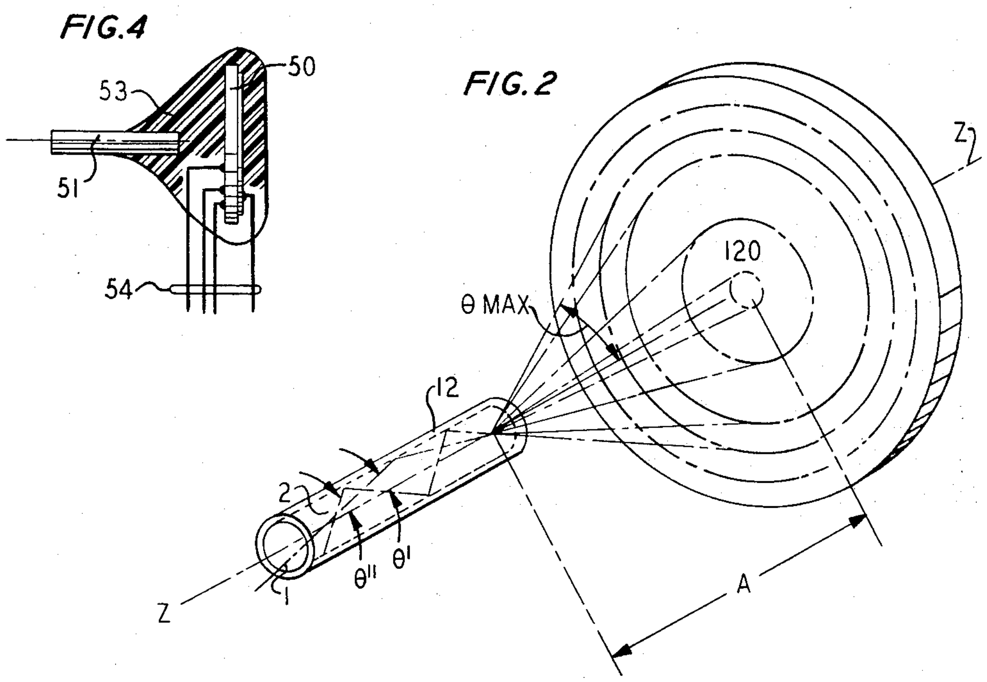
FIG. 2 shows the output end of a multimode optical fiber, and the radiation pattern of the wave energy emitted by the fiber.
FIG. 4 shows the detector bonded to a small length of optical fiber.

As is known, each of the various propagating modes supported by a multimode optical fiber is characterized by a ray progressing along the fiber at a characteristic angle to the fiber axis, as shown in FIG. 2. For purposes of illustration, two rays 1 and 2 are illustrated, where a lower order mode ray 1 is shown propagating at an angle $\theta'$ to the fiber axis, and a higher order mode ray 2 is shown directed at a larger angle $\theta''$ to the axis. Both rays are reflected at the core-cladding interface and, hence, are guided. Those higher order modes, whose angles of incidence at the interface are less than critical, tend to radiate out of the fiber and, hence, do not reach the output end of the line.

The total radiation field at the end of the fiber is concentrated within the cone formed by the highest order propagating mode. Radiating into a matching medium, this maximum cone angle, $\theta_{max}$, is given by $$\theta_{max} = \sqrt{2\Delta} \qquad (1)$$

where $\Delta = n_{cl} - n/n$ $n$ is the refractive index of the fiber core; and $n_{cl}$ is refractive index of the cladding. Typically, $\Delta$ is less than 0.1. Since the core radius is of the order of tens of $\mu m$, far-field conditions are established at about a millimeter from the fiber end. The far-field radiation of the fastest mode (i.e., the lowest order mode) is in a very narrow cone 20 along the fiber axis Z—Z. Each of the slower propagating modes (i.e., the higher order modes) shows little radiation along the axis, but produces a radiation maximum at a different angle $\theta$ with the axis. The relative delay, $\tau$, between any of the higher order modes and the fastest mode is given by $$\tau = nL/2c\ \theta^2 \qquad (2)$$

where $L$ is the line length;

$c$ is the vacuum velocity of light;

and $\theta$ is the ray angle of the particular mode.

Hence, a mode with a delay, $\tau$, radiating into a matching material, illuminates a ring of radius $$r = \theta A \quad (3)$$

where A is the distance between the end of the fiber and a plane perpendicular to the fiber axis.

In a detector-equalizer, in accordance with the present invention, the detector portion comprises an array of photodectors whose physical configurations conform to the above-described radiation pattern. Each of the individual photodetectors is proportioned to respond to a prescribed mode, or groups of modes. The resulting output signals are delayed an appropriate amount relative to each other so as to compensate for the dispersion introduced in the optical transmission wavepath. The signals are then combined in a common output circuit.

Figure 3:
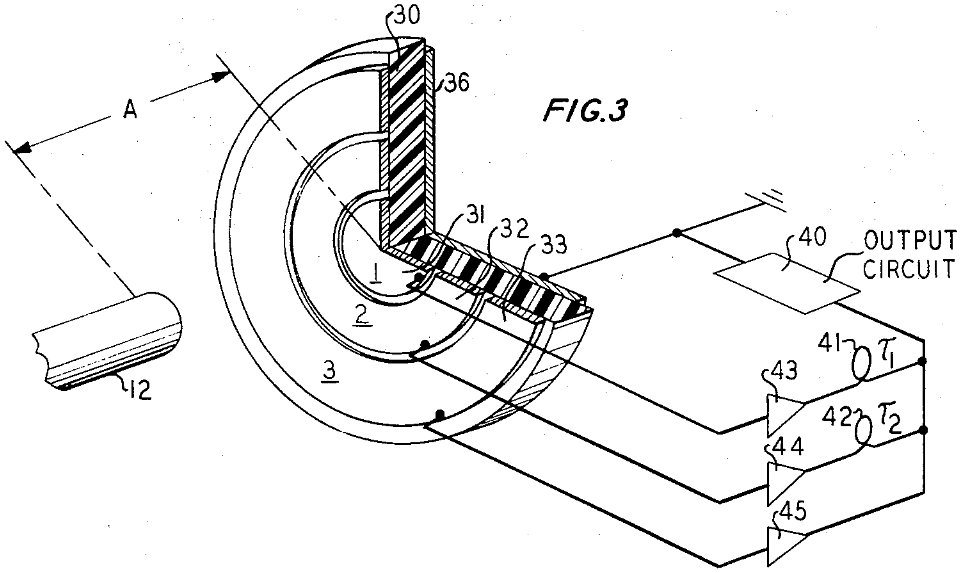
FIG. 3 shows a detector-equalizer circuit in accordance with the present invention.

FIG. 3, now to be considered, shows one specific embodiment of the invention wherein each of the detector segments is of the type described by M. V. Schneider in his article entitled "Schottky Barrier Photodiodes with Antireflection Coating," published in the November 1966 issue of the Bell System Technical Journal, pages 1611–1638. Specifically, the detector comprises a platelet 30 of a semiconductor material of one conductivity type on which a semitransparent metal is deposited to form three concentric circular portions 31, 32 and 33. Mounted on the back side of platelet 39, and making ohmic contact therewith, is a conductive plate 36, forming a common electrode. Together, the three metallic portions, the common electrode, and the semiconductor platelet form three separate Schottky barrier photodiodes 1, 2 and 3 wherein the inside and outside diameters of each of the respective metallic portions 31, 32 and 33 is related to the various modes as set forth in equation (3). The incident radiation is advantageously matched into the diodes by an antireflection coating (not shown) which is deposited on the semitransparent metal.

A common output circuit 40 is connected at one end to conductive plate 36, and at its other end to each of the metallic portions of the respective photodiodes by separate means which include, as required, delay means and, optionally, amplifying means. Specifically, delay networks 41 and 42 are included between diodes 1 and 2, respectively, and output circuit 40. No added delay need be included between the outermost diode 3, which serves to detect the highest order group of modes (i.e., the slowest propagating modes).

Designating the total average delay at the output end of fiber 12 for each of the three groups of modes to be separately detected as $D_1 < D_2 < D_3$, where Dis the delay of the lowest order modes, $D_3$ is the delay of the highest order modes, and $D_2$ is the delay of the intermediate order modes, the average added delays $\tau_1$ and $\tau_2$ introduced by the two delay networks 41 and 42 are given by $$\tau_1 = D_3 - D_1 \quad (4)$$

$$\tau_2 = D_3 - D_2 \quad (5)$$

EXAMPLE

While other types of photodiodes (i.e., *p–n* or *p-i-n* junction diodes) can just as readily be used to form an array of detectors in accordance with the present invention, invention, for purposes of explanation and illustration, an array of Schottky barrier diodes, of the type described in connection with FIG. 3, is considered. In particular, each diode (as described in the above-identified article) comprises a semitransparent gold layer deposited on *n*-type epitaxial silicon. A zinc sulfide antireflection coating matches the diode to the incident radiation. So constructed, a quantum efficiency of 70 percent has been achieved at the He-Ne laser wavelength of 6,328A. Of particular interest with regard to the present invention is the fact that the pulse response of such a diode to 0.5 nanosecond wide pulses has a symmetrical pulse shape with only slight distortion due to carrier diffusion, and the reactance in the total package.

In operation, the detector array is coaxially aligned with the fiber axis at a distance A from the end of the fiber, where A is as given by equation (3). The optimum location and orientation is conveniently realized by illuminating the fiber by means of a pulsed incoherent source, and then varying the position of the detector relative to the fiber end until the narrowest output pulse is obtained. The detector and fiber are then bonded together to form a permanent connection. This procedure can be performed in the field, in which case the detector is connected directly to the end of a service fiber. Alternatively, the aligning and bonding procedure can be performed at the factory, in which case the detector is connected to a small segment of fiber. The latter arrangement is illustrated in FIG. 4 which shows a detector 50 and a short segment of fiber 51 bonded together by means of a potting material 53 whose refractive index approximately matches that of the fiber core. Leads 54 permit connecting the output load or loads to the detector. In the field, the fiber segment 51 is then spliced to the terminal end of a service fiber. This can be done, for example, in the manner described in the copending application of R. F. Trambarulo, Ser. No. 239,034, filed Mar. 20, 1972, or of F. A. Braun et al, Ser. No. 227,908, filed Feb. 22, 1972, both of which are assigned to applicant's assignee.

To exclude ambient light, the detector is advantageously placed in a lightproof enclosure when in operation. Because of their small size, and the large numbers in which such devices will be used, a common enclosure to house the terminal end of an optical fiber cable would appear to be preferable over a separate lightproof enclosure for each of the individual detectors.

For purposes of illustration, we assume a fiber length $L = 1$ km, and a $\Delta$ for the fiber of 0.01, where $$\Delta = n_{cl} - n/n; \quad (6)$$

$n_{cl}$ is the refractive index of the fiber cladding; and $n$ is the refractive index of the fiber core.

The delay $T$ for the fastest mode is $$T = nL/c = 5{,}000 \text{ nanoseconds.} \quad (7)$$

The added delay $\tau_{max}$ for the slowest mode is $$\tau_{max} = \Delta T = 50 \text{ nanoseconds.}$$

Radiating into a matching material, as in FIG. 4, the maximum radiation angle, $\theta_{max}$, at the fiber end for the slowest mode is $$\theta_{max} = \sqrt{2\Delta} = 0.141 \text{ radians } 8.1°. \text{ max}$$

Assuming a maximum detector diameter D of 10 mils, the distance $A$ is, therefore, $$A = 0.005/0.14 = 0.035''.$$

We assume, for purposes of illustration, three detector areas, where each of the areas 31, 32 and 33 collects radiation over a delay interval $0 - \tau_{max}/3$, $\tau_{max}/3 - 2\tau_{max}/3$, and $2/3\ \tau_{max} - \tau_{max} - \tau_{max}$, respectively. Using the relationship $$\tau' = \tau_{max}\ (\theta/\theta_{max})2, \tag{8}$$

the resulting delay interval, radiation angle range, and detector ring diameters are given in the following tabulation:

TABLE I

| Delay interval nanoseconds | Radiation angle range—degrees | Detector ring diameter—mils |
|---|---|---|
| $0-(\tau_{max}/3)=0-16.6$ | 0–4.7 | 0–5.75 |
| $\tau_{max}/3)-⅔\ \tau_{max}=16.6-33$ | 4.7–6.6 | 5.75–8.1 |
| $⅔\tau_{max}-\tau_{max}=33-50$ | 6.6–8.1 | 8.1–10 |

Some small space will, of course, be left between adjacent detector areas.

The average delay for each of the three detector sectors is 8.3, 25 and 41.6 nanoseconds. Hence, the added average delays $D_1$ and $D_2$ are $$D_1 = 41.6-25 = 16.6 \text{ nanoseconds}$$

and $$D_2 = 41.6-8.3 = 33.3 \text{ nanoseconds.}$$

Using air filled coaxial cable as delay lines, the delay $D_1$ is obtained in 16 feet of cable, and delay $D_2$ is obtained in 33 feet of cable. For coaxial cable with a dielectric for which $\epsilon = (1.5)^2$, the indicated delays are obtained in 11 feet and 25 feet of cable, respectively. Alternatively, lumped-element delay networks can be used.

It will be noted that by using three detector sectors, the minimum realizable dispersion is $\tau_{max}/3$ or $50/3 =$ 16.6 nanoseconds. This can be reduced by increasing the number of sectors. For example, since the Schottky barrier diode described by Schneider in his above-identified article is capable of detecting pulses as short as 0.5 nanoseconds, additional detector sectors, covering smaller delay increments, will result in greater time resolution in the output signal. Hence, the number of diode sectors to be used will depend upon the requirements of the particular application.

It may also be advantageous to employ some amplification before combining the several detector signals in order to improve the signal to noise ratio in those cases where the delay networks are lossy. Accordingly amplifiers 43 and 44 are shown included between detectors 1 and 2 and delay networks 41 and 42. Amplifier 45, included between detector 3 and the output circuit, maintains the necessary amplitude balance among the output signal components.

As indicated above, the detector array can, alternatively, be used for mode separation purposes. For example, each of a number of different modes can represent a different signal of a plurality of spacially multiplexed signals. By coupling each of the photodetectors to a different output circuit, the individual signals can be separately recovered.

While the invention has been described in the context of multimode signals propagating in multimode waveguides, a similar detector arrangement can be used with multifrequency signals propagating in single mode fibers. As is explained in greater detail in the copending application of E. A. J. Marcatili, Ser. No. 272371, filed July 17, 1972, and assigned to applicant's assignee, just as the different modes in a multimode system propagate at different velocities, optical signals having the same modal configuration, but different frequencies, also propagate at different velocities. Accordingly, the explanation given hereinabove, in connection with FIG. 2, is equally applicable to multifrequency signals in single mod fibers. Correspondingly, the detector arrangement of FIG. 3 can alternatively be used as a frequency detector, or as a delay-equalizer for multifrequency signals propagating along single mode fibers. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. For use with an optical fiber transmission line, a detector comprising:

an array of concentric, circular, photo-responsive regions, each dimensioned to intercept, within different ranges of angles, wave energy radiated at the end of said fiber.

2. The detector according to claim 1 wherein said fiber is a multimode transmission line at the frequencies of interest;

and wherein each of said regions intercepts wave energy associated with one of a plurality of guided modes, or with a selected group of said modes.

3. The detector according to claim 1 wherein each of said photo-responsive regions is coupled to an output circuit.

4. The detector according to claim 1 including a common output circuit;

and means for coupling each of said photo-responsive regions to said common output circuit.

5. The detector according to claim 1 wherein said coupling means includes delay networks for compensating for the delay distortion produced in said fiber.

6. The detector according to claim 1 wherein each of said detector regions comprises a Schottky barrier photo-diode.

7. The detector according to claim 1 including a segment of optical fiber bonded to said detector such that the longitudinal axis of said fiber is concentric with said array of photo-responsive regions.

8. For use in a multimode optical fiber transmission system, a detector-equalizer including:

an array of concentric, circular, photodetectors located at the end of said fiber, where each of said photodetectors is dimensioned to selectively intercept energy radiated from the end of said fiber by different groups of propagating modes;

a common output circuit;

and means including delay networks, for coupling the output signals from said array of photodetectors to said output circuit to minimize the delay distortion introduced by said fiber.

9. The detector-equalizer according to claim 8 wherein the means for coupling the output signals from the photodetectors responsive to the faster propagating modes include delay networks for equalizing the total average delay for all of said groups of modes.

10. The detector-equalizer according to claim 8 wherein said coupling means include signal amplifiers.

* * * * *